United States Patent
Herron et al.

(10) Patent No.: US 9,952,587 B2
(45) Date of Patent: Apr. 24, 2018

(54) METHOD AND SYSTEM FOR ASSEMBLY PROCESS

(71) Applicant: Caterpillar Inc., Peoria, IL (US)

(72) Inventors: Joseph R. Herron, Farmington, IL (US); Yamin Z. Mohammed, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 434 days.

(21) Appl. No.: 14/830,198

(22) Filed: Aug. 19, 2015

(65) Prior Publication Data

US 2017/0052533 A1 Feb. 23, 2017

(51) Int. Cl.
*G05B 15/00* (2006.01)
*G05B 19/418* (2006.01)

(52) U.S. Cl.
CPC ............ *G05B 19/41865* (2013.01); *G05B 2219/31027* (2013.01); *G05B 2219/31029* (2013.01); *G05B 2219/31066* (2013.01); *Y02P 90/04* (2015.11); *Y02P 90/20* (2015.11)

(58) Field of Classification Search
CPC .............................. Y02P 90/04; Y02P 90/20
USPC ....................................................... 700/83
See application file for complete search history.

(56) References Cited

U.S. PATENT DOCUMENTS

| | | | |
|---|---|---|---|
| 6,105,520 A | 8/2000 | Frazer et al. | |
| 6,381,556 B1* | 4/2002 | Kazemi | G05B 19/41875 345/594 |
| 6,876,894 B1 | 4/2005 | Chen et al. | |
| 6,993,723 B1* | 1/2006 | Danielsen | G06Q 10/0631 705/7.12 |
| 2013/0123964 A1* | 5/2013 | Cooper | G05B 13/00 700/97 |
| 2015/0046363 A1 | 2/2015 | McNamara et al. | |
| 2015/0058067 A1 | 2/2015 | Yuen et al. | |
| 2016/0334778 A1* | 11/2016 | Cope | G05B 19/401 |

* cited by examiner

*Primary Examiner* — Mohammad Ali
*Assistant Examiner* — Md Azad
(74) *Attorney, Agent, or Firm* — Miller, Matthias & Hull

(57) ABSTRACT

A system and method relating to an assembly process of a machine is disclosed. The machine may include a plurality of attachments categorized as core or optional. Each attachment may include a plurality of components each categorized the same as the attachment which the component is a part of. The system may comprise a user interface and a controller configured to display machine information. The machine information may include an image of a portion of the machine. Components categorized as core may be visually differentiated from components categorized as optional. The controller may be configured to modify the categorization of a first attachment, change a first process day on which the first attachment is deducted from inventory to a second process day as a result of modifying the categorization, and adjust a need date for the plurality of components of the first attachment based on the change.

16 Claims, 11 Drawing Sheets

METHOD AND SYSTEM FOR ASSEMBLY PROCESS

TECHNICAL FIELD

The present disclosure generally relates to systems and methods for improving the assembly efficiency for customized machines.

BACKGROUND

Customers desire shorter time periods between when an order is placed for a machine and when the machine is available for delivery. To meet this goal, manufacturers look to shorten the assembly time of the machine. This can be difficult because machines and vehicles (each, a "machine") used for earth moving, material handling, paving, construction, mining, agricultural and other industrial and commercial uses are complex in design and are typically assembled over a plurality of days. Furthermore, a plurality of optional attachments is often installed to customize the machine for a buyer. As such, it is difficult to identify and remove throughput bottlenecks and obstacles that occur during assembly of a customized machine and their contributing factors.

U.S. Pat. No. 6,105,520 issued Aug. 22, 2000 discloses an automated scheduling system which automatically generates and distributes schedules for the making of quilted products listed in input customer orders. The generation of schedules is carried out by a programmed central scheduling computer which considers stored data identifying each of machines and their capabilities, the materials available for production of the products and the product specifications and determines the machine setting and material requirements for each product on the customer order list. Schedules for each machine are generated so as to schedule each product with other products having similar machine setting or material requirements. While scheduling such batch processing may be beneficial to reduce manufacturing set-up time, a system that reduces the overall assembly time of a machine is desirable.

SUMMARY OF THE DISCLOSURE

In accordance with one aspect of the disclosure, a system relating to an assembly process of a machine is disclosed. The machine may be assembled over a plurality of process days and may include a plurality of attachments. Each attachment may be categorized as core or optional. Each attachment may include a plurality of components. Each component may be categorized the same as the attachment which the component is a part of. The system may comprise a user interface and a controller in communication with the user interface. The controller may be configured to display an image of a portion of the machine on the user interface. The portion may include at least a portion of a first attachment. Components categorized as core may be visually differentiated on the user interface from components categorized as optional. The controller may be further configured to modify the categorization of the first attachment, change a first process day on which the first attachment is deducted from inventory to a second process day as a result of modifying a categorization of the first attachment, and adjust a need date for the plurality of components of the first attachment based on the change to the second process day.

In accordance with another aspect of the disclosure, a method relating to an assembly process of a machine is disclosed. The machine may be assembled over a plurality of process days. The machine may include a plurality of attachments, each attachment categorized as core or optional. Each attachment may include a plurality of components, each component categorized the same as the attachment which the component is a part of. The method may comprise displaying on a user interface an image of a first portion of the machine. The first portion may include at least a portion of a first attachment. Components categorized as core are visually differentiated on the user interface from components categorized as optional. The method may further include modifying a categorization of the first attachment, changing a first process day on which the first attachment is deducted from inventory to a second process day based on the modifying and adjusting, by a controller, a need date for the plurality of components of the first attachment based on the changing.

In accordance with a further aspect of the disclosure, a system delaying differentiation in an assembly process of one or more machines in a group of related machines is disclosed. Each machine may be assembled over a plurality of process days according to an assembly plan, and may include a plurality of attachments. Each attachment may be categorized as core, structurally significant or bolt-on. Each attachment may include a plurality of components, each component categorized the same as the attachment which the component is a part of. The system may comprise a user interface and a controller in communication with the user interface. The controller may be configured to display on the user interface for one or more of the machines a comparison of a quantity of core components, a quantity of structurally significant components and a quantity of bolt-on components. The controller may be further configured to display on the user interface for at least one process day the quantity of core components and the quantity of structurally significant components and the quantity of bolt-on components for at least one machine. The controller may be further configured to display on the user interface a first portion of at least one machine on the user interface, wherein components categorized as core, structurally significant or bolt-on are visually differentiated from each other, modify a categorization of a first attachment, change a first process day on which the first attachment is deducted from inventory to a second process day when the categorization of the first attachment is changed and adjust a need date for the first attachment based on the change from the first process day to the second process day.

DETAILED DESCRIPTION

Figure 1:
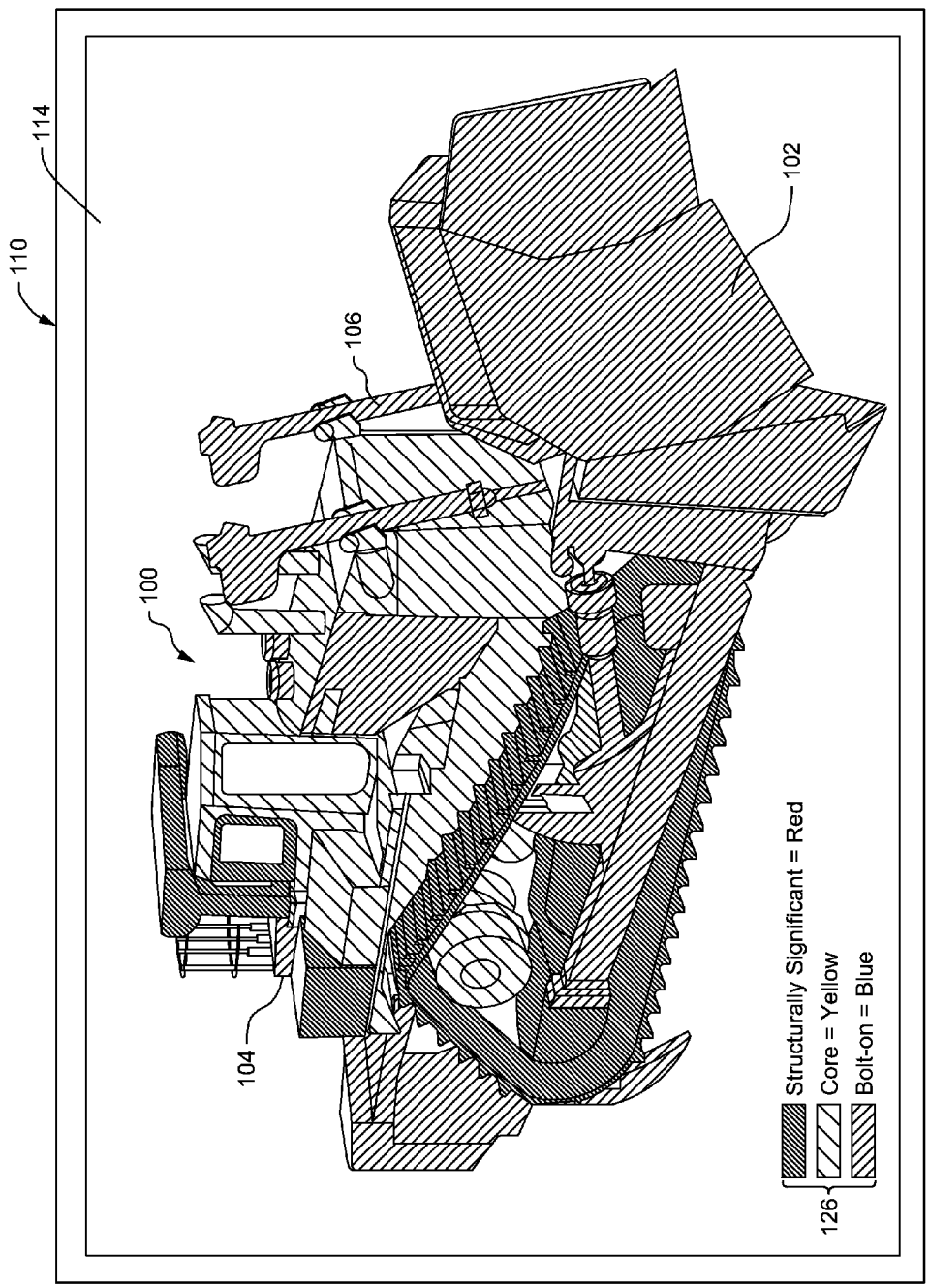
FIG. 1 is an exemplary machine.

The system and method described herein relates to the assembly of a machine 100. FIG. 1 illustrates an exemplary machine 100. While the exemplary machine 100 shown in FIG. 1 is a track-type tractor, the teachings of this disclosure may be utilized with other types of machines 100.

The machine 100 may comprise a plurality of attachments 102. Related attachments 102 may be grouped together (for reference, not necessarily physical placement on the machine 100) and referred to as an "arrangement" 104. In some embodiments, the machine 100 may comprise a plurality of arrangements 104, or alternatively may comprise a plurality of arrangements 104 and a plurality of attachments 102.

Each attachment 102 includes a plurality of components 106. The combination of attachments 102 (and/or arrangements 104) defines a manufacturing bill of material (BOM) for the machine 100. The manufacturing BOM typically identifies all of the components 106 that roll up into the machine 100. The manufacturing BOM may also identify assemblies 130 (FIG. 7) and sub assemblies 132 (FIG. 6) and which components 106 roll up into such assemblies 130 and sub assemblies 132. In some cases, the assemblies 130 or sub assemblies 132 may include components 106 (FIG. 1) of one or more attachment(s) 102. Typically, a machine 100 is assembled over a plurality of process days 138 (see FIG. 8) according to an assembly plan.

Figure 2:
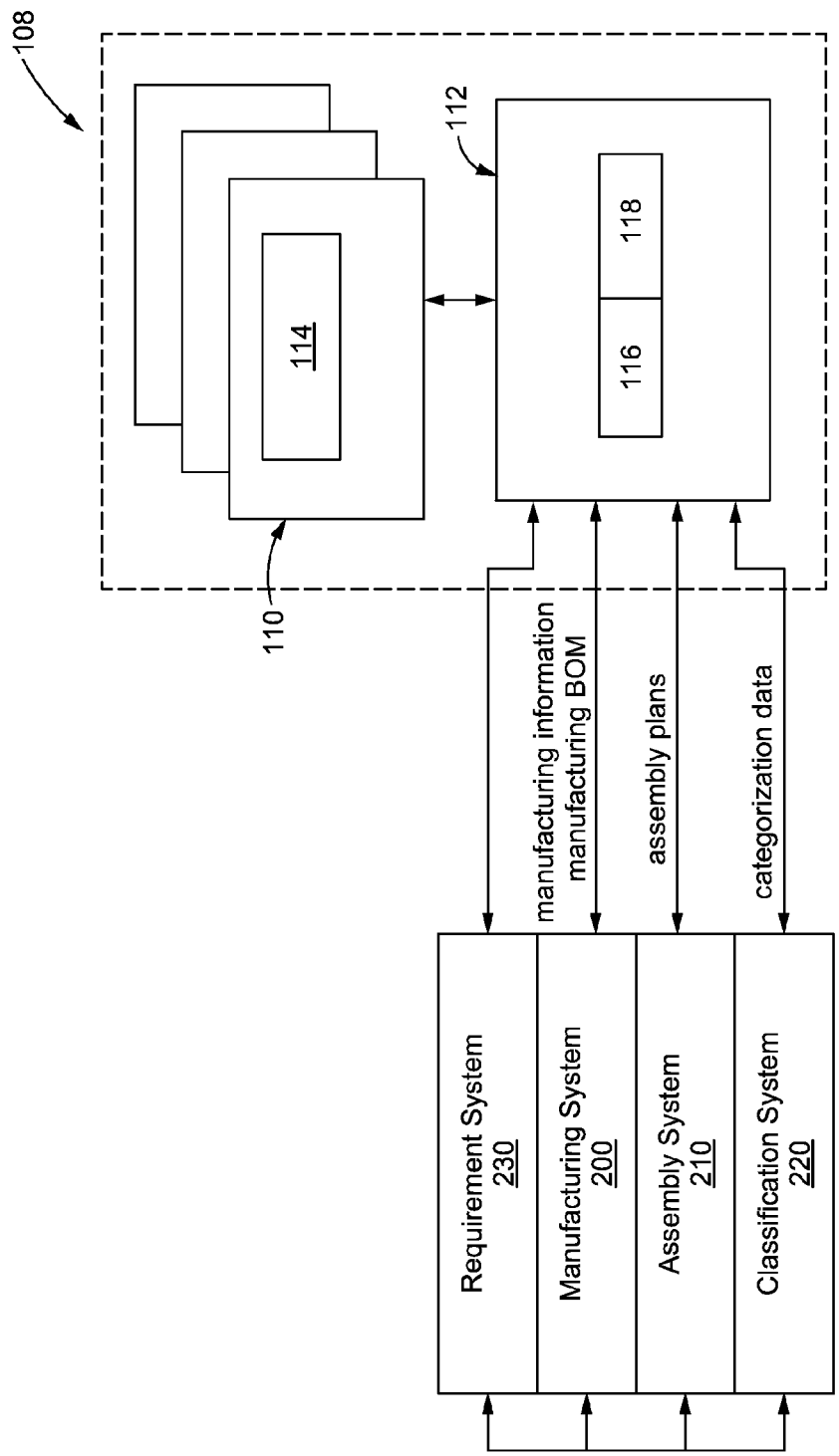
FIG. 2 is a schematic of an exemplary embodiment of a system in accordance with the teachings of this disclosure.

Referring now to FIG. 2, there is shown a schematic of a system 108 related to the assembly process in accordance with the present disclosure and generally referred to by reference numeral 108. This disclosure describes exemplary embodiments of the system 108.

As shown in FIG. 2, the system 108 may comprise a user interface 110 and a controller 112. The system 108 may be in communication with a manufacturing system 200, an assembly system 210, a classification system 220 and a requirements system 230.

The manufacturing system 200 may be configured to generate manufacturing information related to the production of ordered and forecasted machines 100. Such manufacturing information includes a manufacturing bill of material (BOM) for each machine 100 to be assembled.

Figure 8:
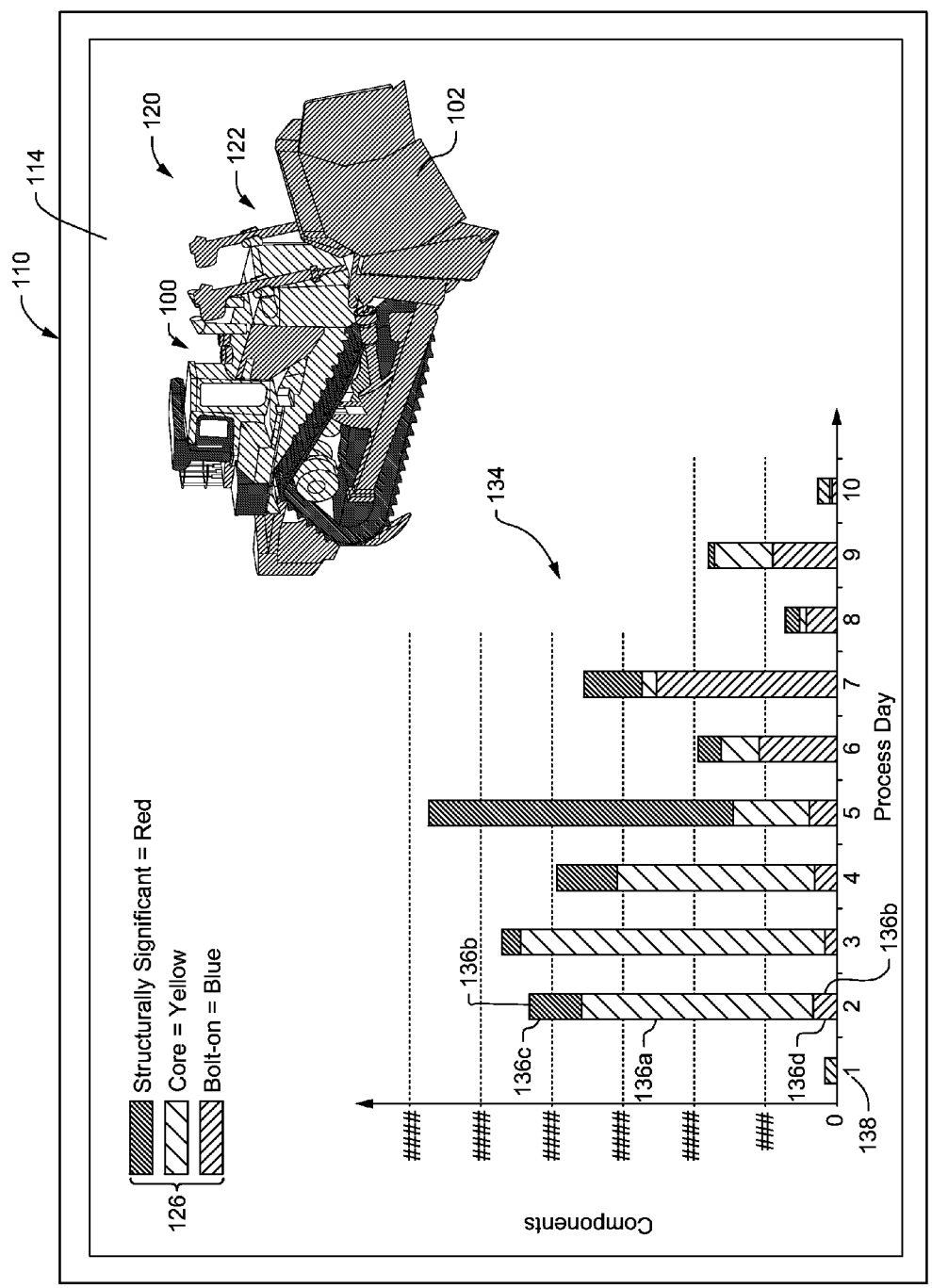
FIG. 8 is another embodiment of the user interface with exemplary machine information displayed on the screen.

The assembly system 210 may be configured to generate an assembly plan for each machine 100 to be assembled. The assembly plan for each machine 100 includes an assembly routing that identifies each assembly operation, an order of the assembly operations and the process day for each assembly operation on the assembly routing. The assembly system 210 may also identify the components 106 (FIG. 1) deducted from inventory by (assembly plan) process day 138 (FIG. 8).

The classification system 220 may be configured to assign (for each machine 100) a category to each attachment 102 (and in some embodiments, each arrangement 104) and its components 106. The result of such assignment is referred to herein as categorization data.

The requirements system 230 may be configured to schedule component 106 and attachment 102 availability and need dates for assembly and/or inventory. The requirements system 230 may be a system such as Material Requirements Planning (MRP), or the like.

The user interface 110 may include a screen 114 and may be configured to display on the screen 114 machine information 120 (FIGS. 4-11) received from the controller 112 (FIG. 2). The user interface 110 may be configured to receive user input and to transmit such user input to the controller 112 for processing.

The controller 112 is in communication with the user interface 110. The controller 112 may include a processor 116 and a memory component 118. The processor 116 may be a microprocessor or other processor as known in the art.

In one embodiment, the controller 112 may be further configured to receive user input from the user interface 110, to transmit machine information 120 (FIGS. 4-11) to the user interface 110 (FIG. 2), and to transmit/receive data to and/or from the manufacturing system 200, assembly system 210, classification system 220 and the requirements system 230. Such data may include, but is not limited to, manufacturing information (including the manufacturing BOMs), assembly plans (including assembly routings and process days 138), categorization data, and need dates for components 106. The controller 112 may be configured to generate control signals to cause the user interface 110 to display the machine information 120 on the user interface 110. The controller 112 may be further configured to store in the memory component 118 the machine information 120.

In some embodiments, the processor 116 may execute instructions and generate control signals for processing the categorization data, manufacturing information (including the manufacturing BOMs), assembly plans (including assembly routings and process days 138), component 106 need dates, and the like, and for generating the machine information 120 to be displayed on the user interface 110. Such processor 116 instructions that are capable of being executed by a computer may be read into or embodied on a computer readable medium, such as the memory component 118 or provided external to the processor 116. In alternative embodiments, hard wired circuitry may be used in place of, or in combination with, software instructions to implement a control method.

The term "computer readable medium" as used herein refers to any non-transitory medium or combination of media that participates in providing instructions to the processor 116 for execution. Such a medium may comprise all computer readable media except for a transitory, propagating signal. Forms of computer-readable media may include any medium from which a computer processor 116 can read.

The controller 112 is not limited to one processor 116 and memory component 118. The controller 112 may be several processors 116 and memory components 118.

INDUSTRIAL APPLICABILITY

Each attachment 102 (FIG. 1) of the machine 100 may be categorized as core or optional. An attachment 102 categorized as core is one that requires more than sixteen hours to disassemble and remove once installed on the machine 100. For example, such core attachments 102 may include wires and hoses that run throughout the machine 100, altitude attachments 102, and frame attachments 102. In aggregate, the plurality of attachments 102 categorized as core for a given machine 100 may be referred to as the "Core Portion" of that machine 100.

Attachments 102 categorized as optional may be further categorized as either structurally significant or bolt-on. An attachment 102 categorized as structurally significant is one that requires in the range of two to sixteen hours of disassembly time to remove the attachment 102 from the machine 100. Such an attachment 102 may be difficult to configure and may require disassembly of other attachments 102 as well (the time to disassembly/remove such other attachments 102 may be included in the range of two to sixteen hours of disassembly time for the attachment 102 categorized as structurally significant). In some embodiments, attachments 102 such as undercarriage, air conditioning and cab glass 102 may be categorized as structurally significant.

An attachment 102 that is categorized as bolt-on is one that requires less than two hours of disassembly time to remove from the machine 100 and does not require disassembly of other attachments 102 in order to remove the attachment 102 from the machine 100. Such attachment 102 does not have to be capable of being physically attached to the machine 100 by bolts, it may be mounted by any other means. In some embodiments, some attachments 102 categorized as bolt-on may be shipped to a dealer, customer or other site and installed on the machine 100 after delivery. Attachments 102 such as cab seat options, coolants, engine enclosures, blade options, lighting groups and operator environment attachments 102 may, in some embodiments, be categorized as bolt-on.

Each component 106 of an attachment 102 is categorized the same as the attachment 102 which the component 106 is a part of. The need date for a component 106 may be substantially determined based on the process day 138 (FIG. 8) that the component 106 is to be deducted from inventory per the assembly plan for the machine 100.

Figure 3:
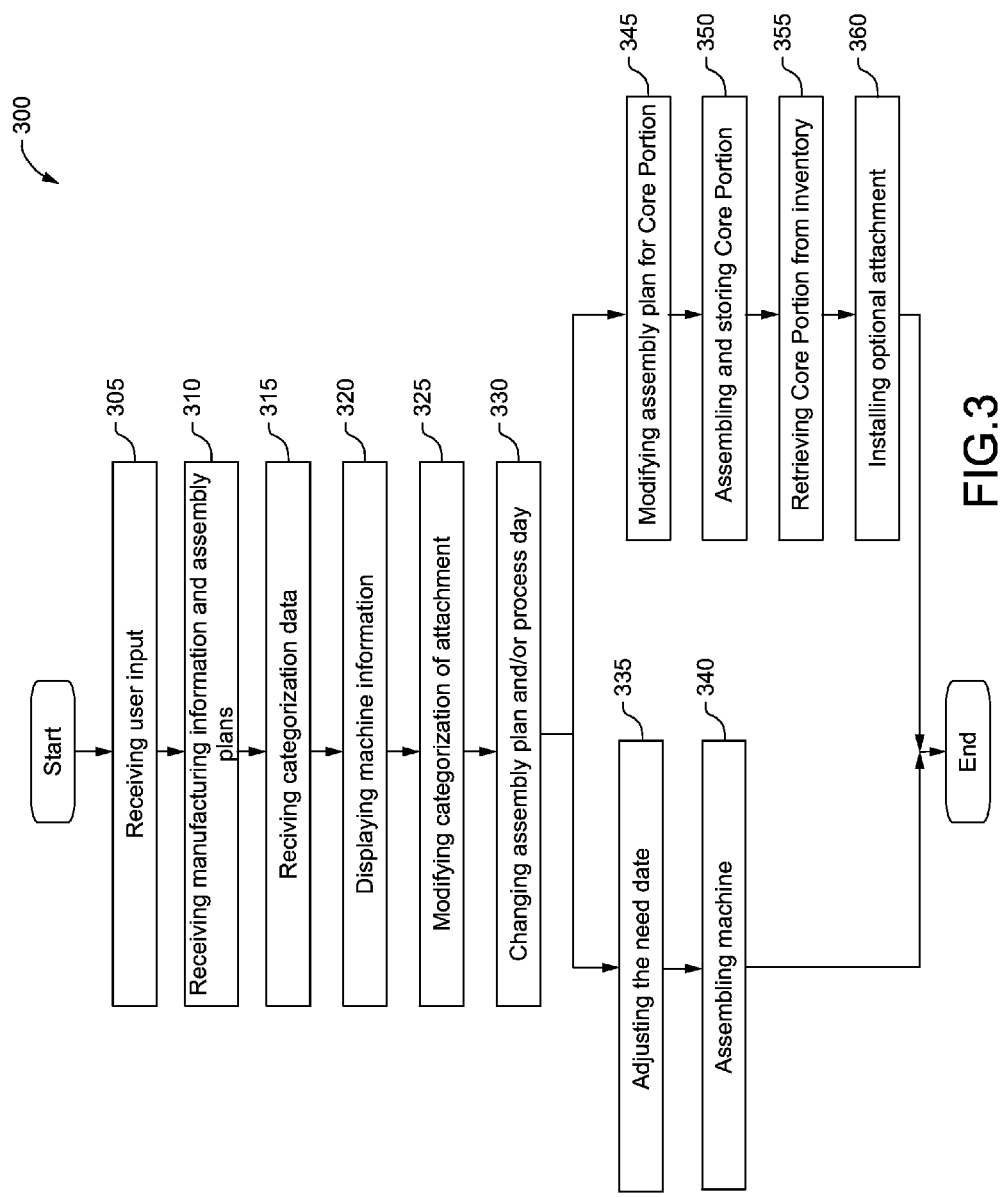
FIG. 3 is a flowchart illustrating exemplary blocks of a method relating to the assembly of a machine.

FIG. 3 is an exemplary flowchart illustrating sample blocks which may be followed in one embodiment of a method 300 relating to the assembly process of a machine 100. The method 300 may be practiced with more or less than the number of blocks shown.

The method 300 includes, in block 305, receiving by the controller 112 user input from the user interface 110 that includes identification of one or more machines 100, arrangements 104, attachments 102, (manufacturing BOM) assemblies 130, (manufacturing BOM) sub assemblies 132, components 106, or combinations thereof. The user input may also include the process day(s) 138 for which the machine information 120 should be obtained. In some embodiments, the user input may include a time window over which the machine information 120 should be obtained. For example, a user may be seeking machine information 120 for all machines 100 of a particular sales model A assembled during a time window of the months of January to March of year xxxx.

The method 300 includes, in block 310, receiving by the controller 112 manufacturing information and assembly plans for the user input. More specifically this includes receiving a manufacturing BOM related to the user input and receiving associated assembly plans. The assembly plans may include an assembly routing related to the user input and may identify the components 106 deducted from inventory on each process day 138 of the assembly plan. The manufacturing BOM may be received from the manufacturing system 200 or may be retrieved from the memory component 118. The assembly plans may be received from the assembly system 210 or may be retrieved from the memory component 118.

The method 300 includes, in block 315, receiving by the controller 112 the categorization data associated with the user input. The categorization data identifies each attachment 102 as either in the core or in the optional category. The categorization data identifies each component 106 of an attachment 102 as either core or optional based on the categorization of the attachment 102 which the component 106 is a part of. In some embodiments in which attachments 102 in the optional category are further categorized as either structurally significant or bolt-on, the categorization data received may identify each attachment 102 as either core, structurally significant or bolt-on, and may identify each component 106 of an attachment 102 as either core, structurally significant or bolt-on based on the categorization of the attachment 102 which the component 106 is a part of. In an embodiment, the categorization data may be retrieved from the memory component 118 or may be received from the classification system 220.

The method 300 includes, in block 320, displaying machine information 120 (FIGS. 4-11), by the controller 112, on the screen 114 of the user interface 110. In an embodiment, the machine information 120 may include an image 122.

The image 122 may be of an (entire) machine 100 or a portion of the machine 100 identified by the user input. The machine 100, or portion of the machine 100, may include one or more arrangements 104 or attachments 102 (and their components 106) of the machine 100. When the image 122 is of the portion of the machine 100, the portion of the machine 100 may include portions of arrangements 104 or at least a portion of one or more attachments 102.

In the image 122, the components 106 (of the machine 100 or portion of the machine 100) that have been categorized as core are visually differentiated from those components 106 that have been categorized as optional. In embodiments in which the optional category has been further broken down into structurally significant and bolt-on, components 106 in each of the three categories (core, structurally significant and bolt-on), are visually differentiated from each other by a visual characteristic 126. For example, in one embodiment, the components 106 categorized as core may be a first color, the components 106 categorized as structurally significant may be a second color, and the components 106 categorized as bolt-on may be a third color. In an embodiment, the first color may be yellow, the second color may be red, and the third color may be blue. In other embodiments, a visual characteristic 126 other than color (for example, hatching, shading or the like) may be used to differentiate between the categories.

In some embodiments, the machine information 120 displayed may further include a listing 128 of the displayed arrangements 104, attachments 102 and/or components 106. In some embodiments, the arrangements 104, attachments 102 and/or components 106 of the listing 128, when displayed, may be organized by category.

Figure 4:
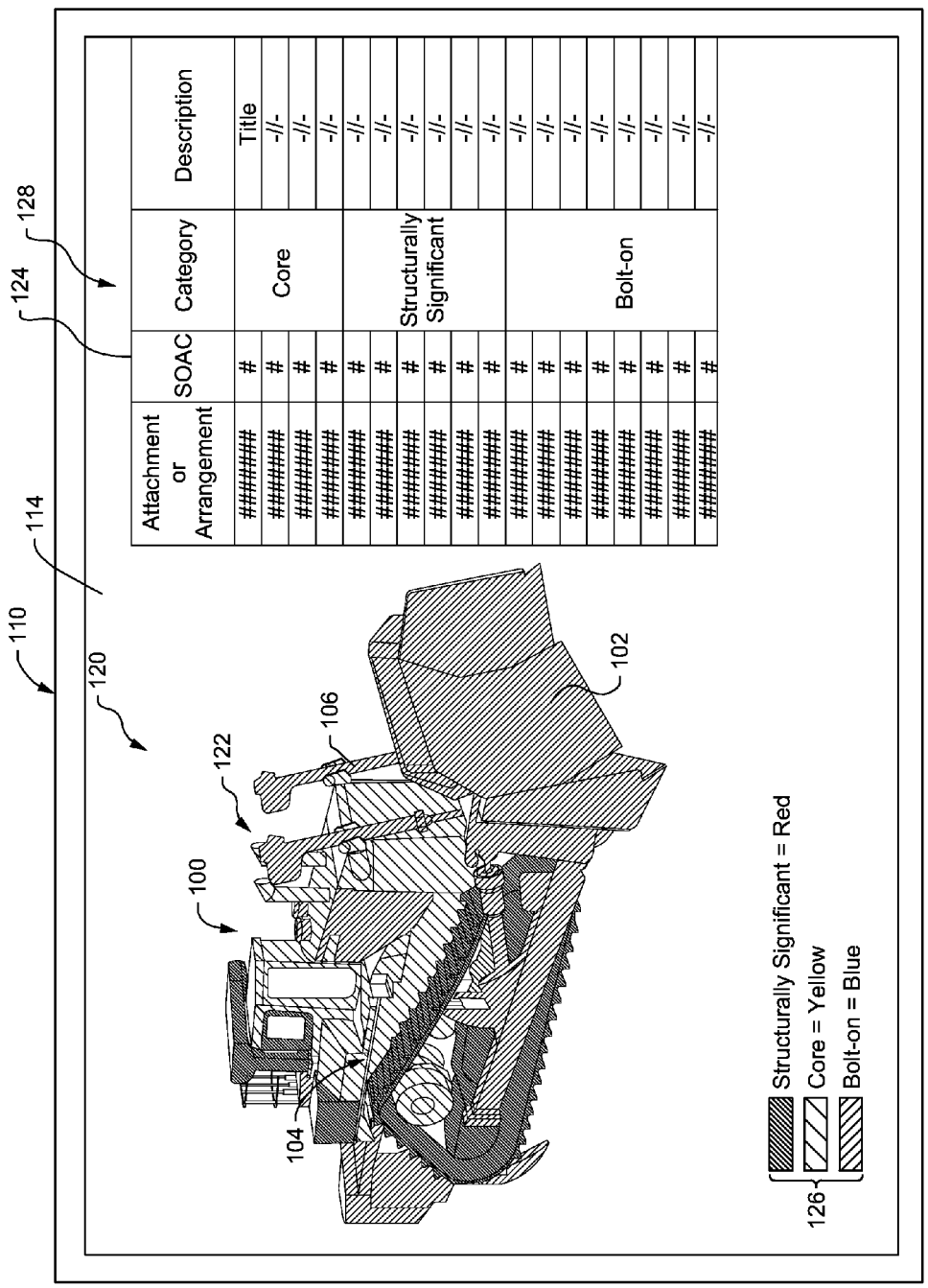
FIG. 4 is an embodiment of a user interface with exemplary machine information displayed on the screen.

FIG. 4 illustrates one example of a screen 114 of a user interface 110 on which machine information 120 is displayed. In FIG. 4, the displayed machine information 120 includes an image 122 of the entire machine 100. In the image 122, the attachments 102 (and their components 106) are differentiated by a visual characteristic 126. In some embodiments, the machine information 120 also includes a listing 128, organized by category, of the attachments 102 for the displayed machine 100. In some embodiments, the listing 128 may also include for each attachment 102 the shipping order assembly code (SOAC) 124. The SOAC 124 is an indicator of whether all components 106 of the attachment 102 are to be installed prior to shipping (Installed), not installed and shipped (Not Installed), or whether the attachment 102 is partially installed with the uninstalled components 106 shipped (Detached).

Figure 5:
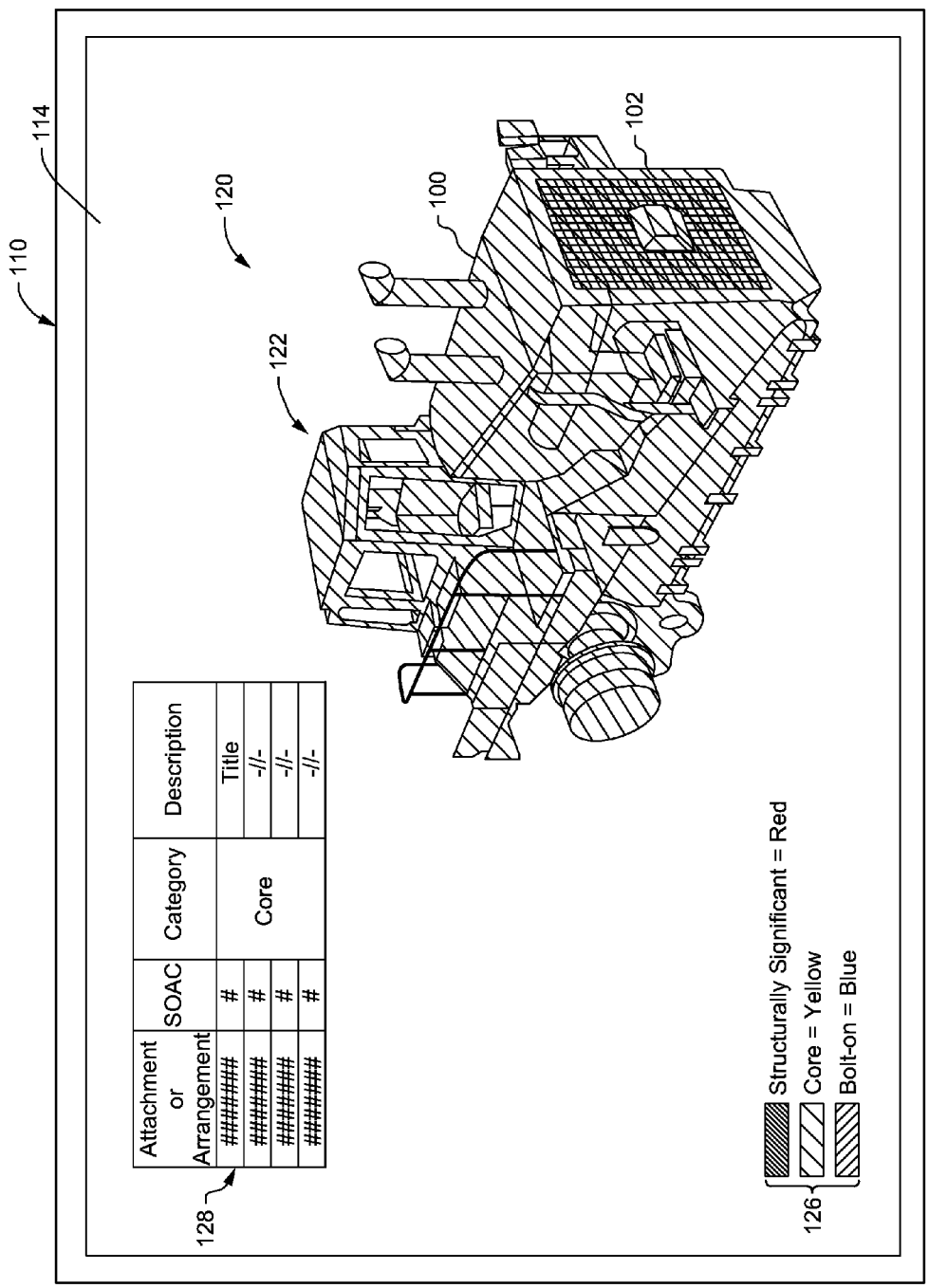
FIG. 5 is another embodiment of the user interface with exemplary machine information displayed on the screen.

FIG. 5 illustrates an alternative embodiment in which the image 122 is of a portion of the machine 100. In this exemplary embodiment, the image 122 is of a Core Portion of the machine 100 (only includes attachments 102 categorized as core). As discussed above, the machine information 120 may also include a listing 128 of the attachments 102 for the displayed portion of the machine 100.

In some embodiments, the portion of the machine 100 to be displayed is one or more assemblies 130 (FIG. 7), sub assemblies 132 (FIG. 6), components 106 or combinations thereof identified by the user input but based on the manufacturing BOM for a selected machine 100.

Figure 6:
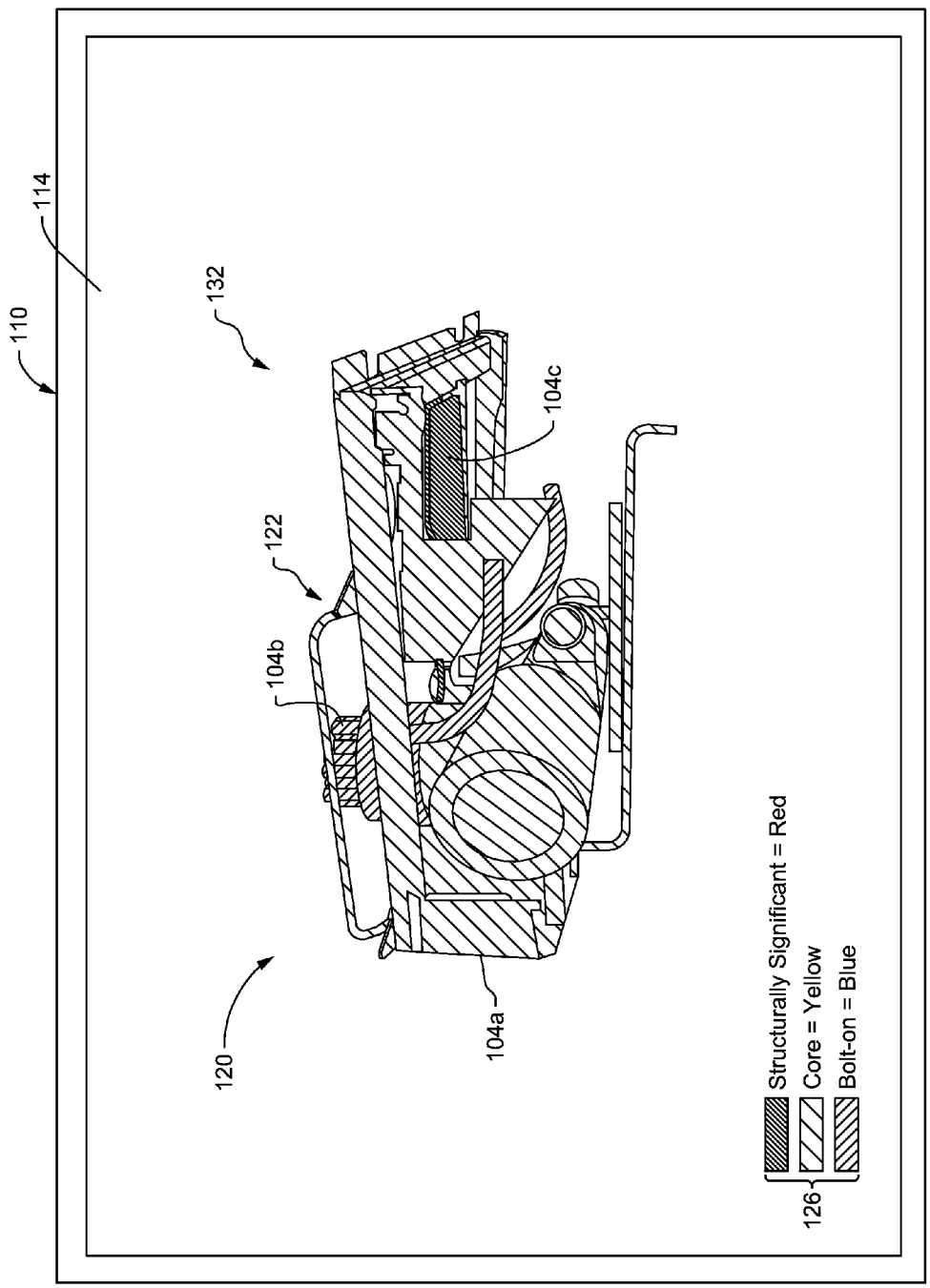
FIG. 6 is another embodiment of the user interface with exemplary machine information displayed on the screen.

FIG. 6 illustrates another embodiment in which the image 122 is of a portion of the machine 100. In this exemplary embodiment, the image 122 is of a portion of the machine 100 that is a sub assembly 132 from the manufacturing BOM. In the exemplary embodiment, the displayed sub assembly 132 includes portions of three different arrangements 104. More specifically, the image 122 of the sub assembly 132 depicts a portion of a first arrangement 104a, a portion of a second arrangement 104b, and a portion of a third arrangement 104c. Components 106 (of the arrangements 104a-c) in each of the three categories (core, structurally significant and bolt-on), are visually differentiated from each other in the image 122.

Figure 7:
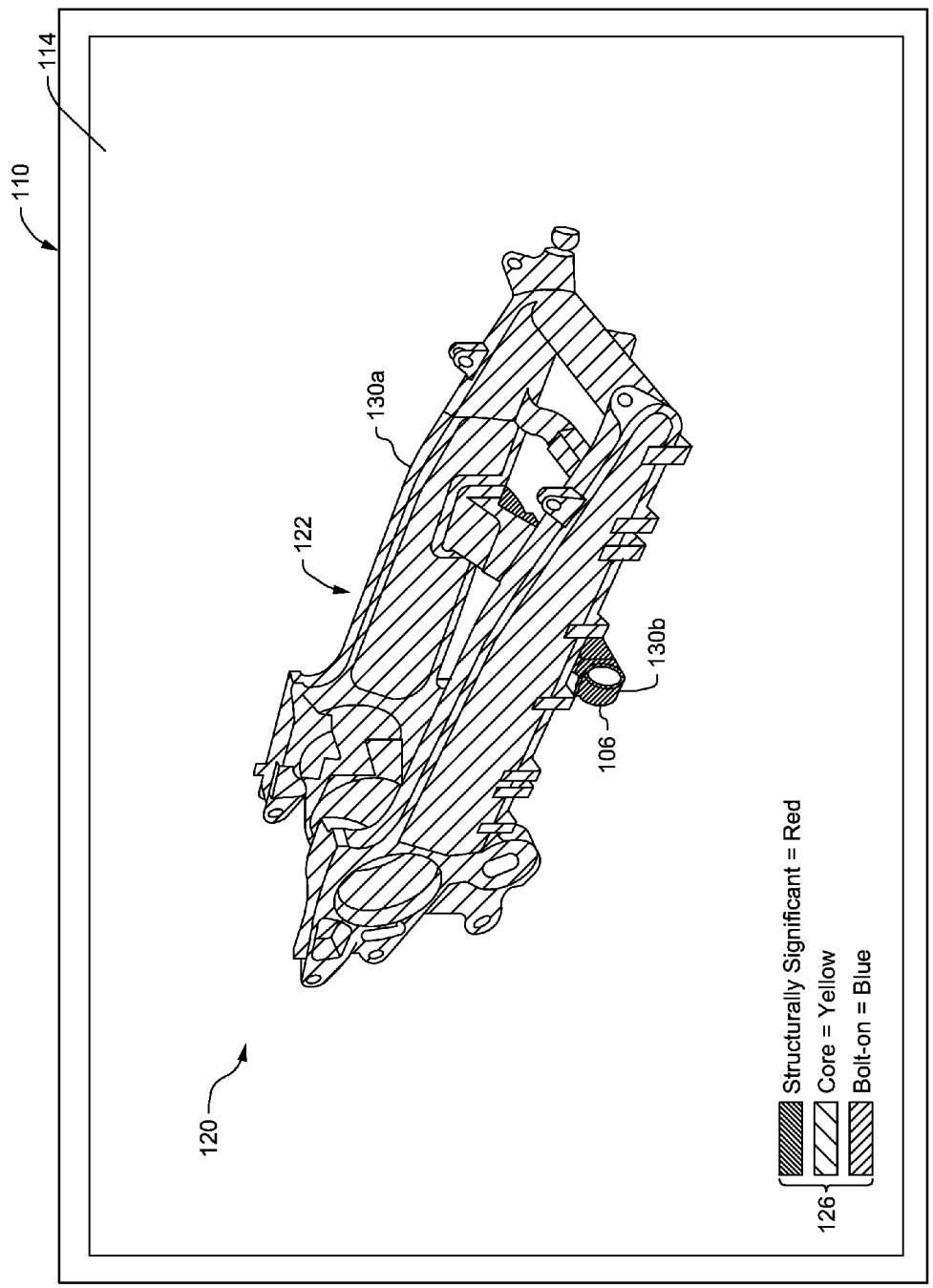
FIG. 7 is another embodiment of the user interface with exemplary machine information displayed on the screen.

In yet another embodiment, the displayed portion of the machine 100 may be part of an assembly 130 or assemblies 130 (as opposed to the entire assembly 130 or sub assembly 132). For example, FIG. 7 illustrates an image 122 in which the first portion is a combination of a first assembly 130a, and a component 106 from a second assembly 130b.

In some embodiments, the displayed machine information 120 may include a comparison 134 (FIGS. 8-11) of a quantity of core components 136a and a quantity of optional components 136b deducted from inventory on each process day 138 for the machine 100, the portion of the machine 100, or for a plurality of machines 100 identified by the user input. In other embodiments, the displayed machine information 120 may include a comparison 134 of a quantity of core components 136a, a quantity of structurally significant components 136c, and a quantity of bolt-on components 136d deducted from inventory on each process day 138 for the machine 100, the portion of the machine 100, or a plurality of machines 100. FIG. 8 illustrates an embodiment in which the machine information 120 includes an entire machine 100 and a comparison 134 in the form of a bar chart comparing the quantities of core, structurally significant and bolt-on components 136a, 136c, 136d deducted from inventory on each process day 138 in an assembly plan for a machine 100. In embodiments in which the comparison 134 is for a plurality of a selected machines 100 assembled over a time window (for example, all of machines 100 of sales model A assembled during January-March of year xxxx) an average value may be used for each of the quantities of core, optional structurally significant and bolt-on components 136a, 136b, 136c, 136d deducted from inventory on each process day 138, as appropriate.

Figure 9:
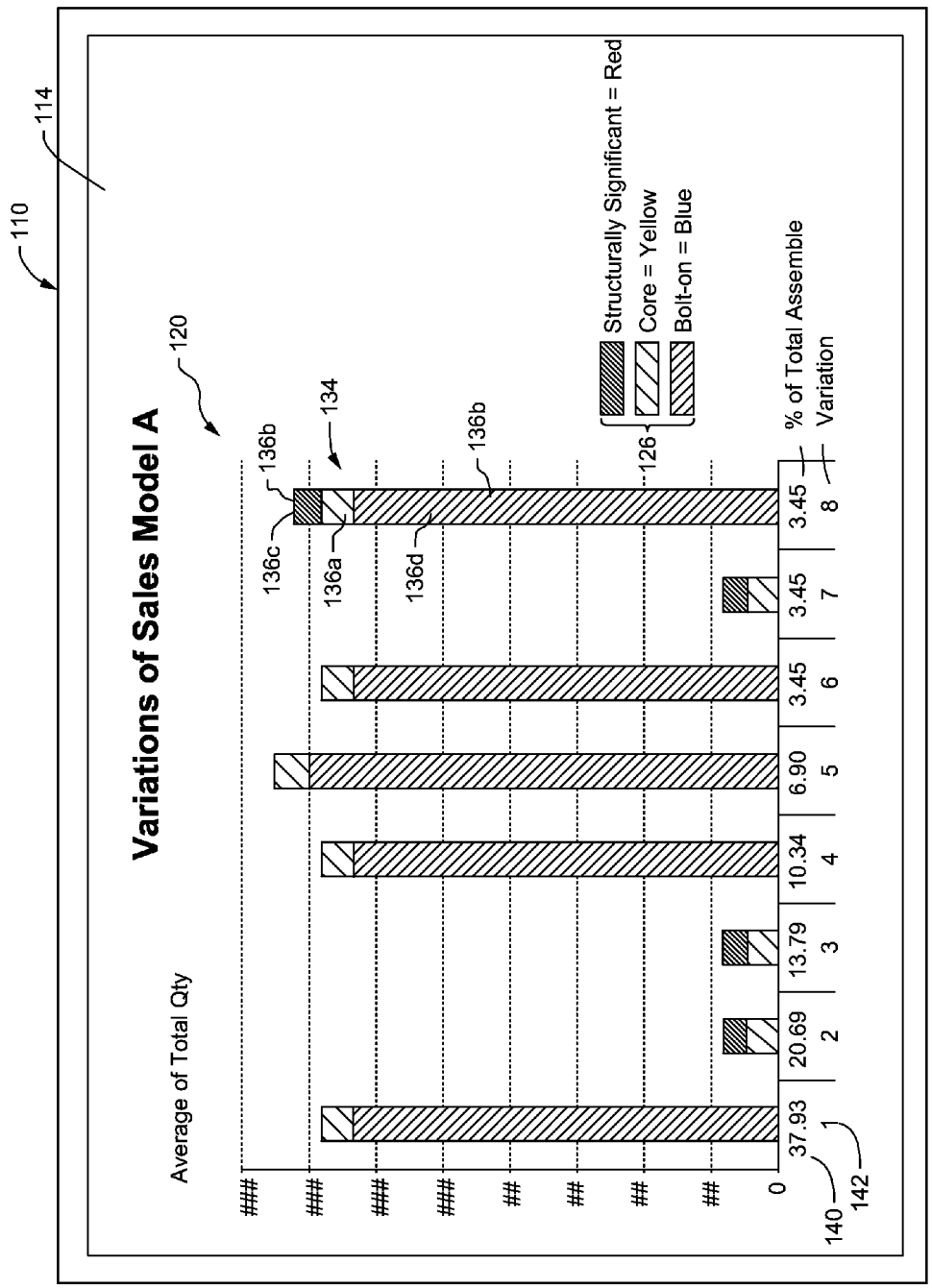
FIG. 9 is another embodiment of the user interface with exemplary machine information displayed on the screen.

The plurality of machines 100 may be dissimilar or similar machines 100 in a selected grouping of machines 100. For example, in one embodiment, the plurality of machines 100 may be a grouping of similar machines 100 in a sales model family. FIG. 9 illustrates such an embodiment in which the displayed machine information 120 includes a comparison 134 of the quantities of core, structurally significant and bolt-on components 136a, 136c, 136d deducted from inventory for a plurality of machines 100 associated with a selected sales model (sales model A), namely variations 142 of the selected sales model. In the embodiment shown in FIG. 9, the quantities of components 106 (in each category) for each variation 142 of machine 100 (in this exemplary embodiment, eight variations 142) are averages (of the total category quantity) for a given process day 138 for that variation 142 assembled during the selected time window. In some embodiments, the machine information 120 may also include, for each machine 100 in the plurality, its percentage of the total quantity of machines 100 assembled 140 (in the selected plurality) within the specified time window. For example, in FIG. 9, variation #1 142 represents 37.93% of all machines 100 assembled in the selected plurality.

Figure 10:
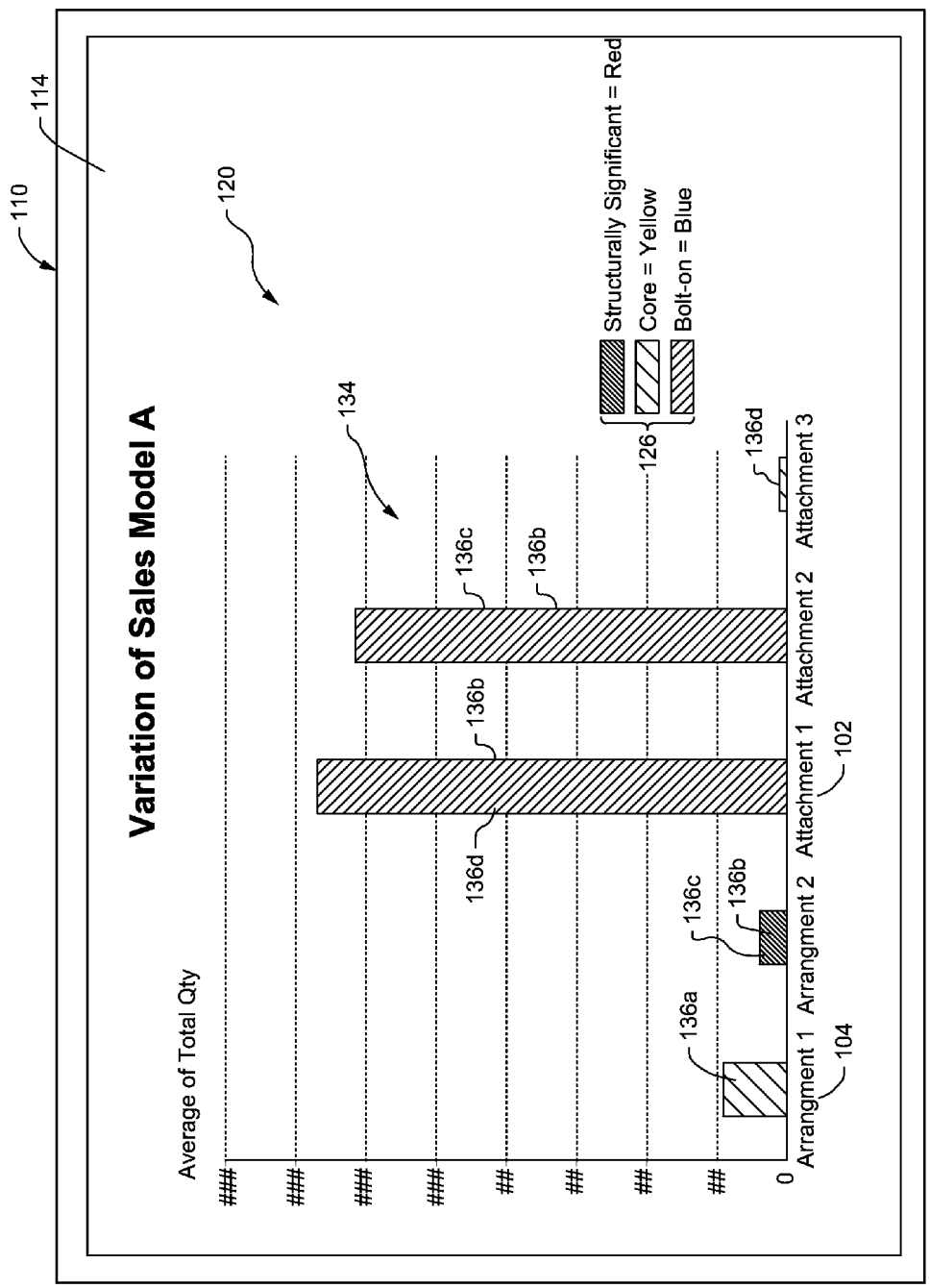
FIG. 10 is another embodiment of the user interface with exemplary machine information displayed on the screen.

In some embodiments, the displayed machine information 120 may include a comparison 134 of a quantity of core components 136a and a quantity of optional components 136b deducted from inventory on each process day 138 for the machine 100, a portion of the machine 100, or an average of a plurality of machines 100 (for example, all variations 142 of FIG. 9) shown by arrangement 104 or attachment 102. In some embodiments, the displayed machine information 120 for the quantity of optional components 136b may be further broken down into a quantity of structurally significant components 136c, and a quantity of bolt-on components 136d deducted from inventory on each process day 138. FIG. 10 illustrates an example of a screen 114 of a user interface 110 on which machine information 120 for a plurality of machines 100 associated with a selected sales model (variations 142 of a selected sales model) is displayed. In FIG. 10, the displayed machine information 120 includes a comparison 134 of the quantity of core components 136a and the quantity of structurally significant components 136c and the quantity of bolt-on components 136d deducted from inventory for each arrangement 104 or attachment 102.

Figure 11:
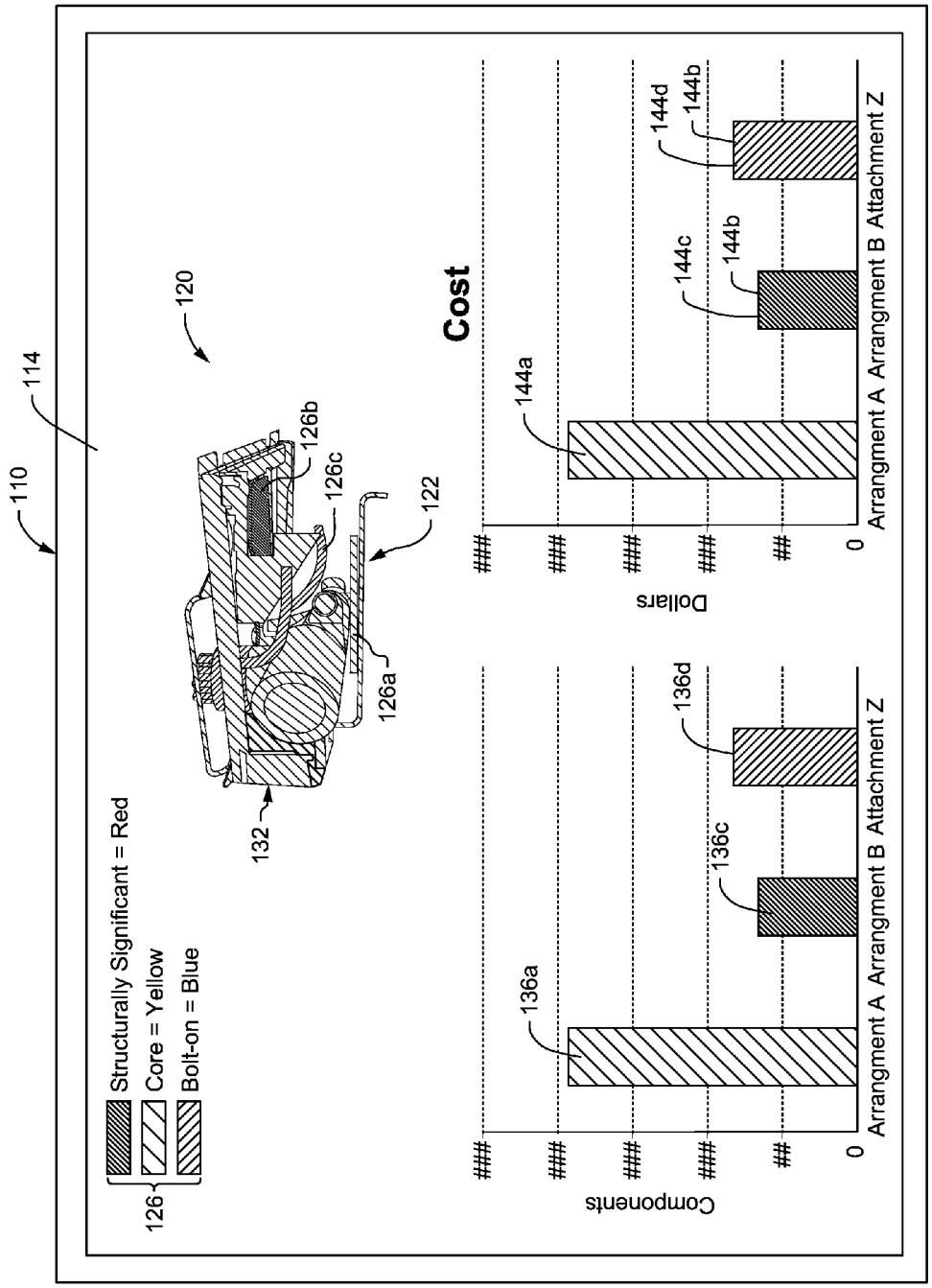
FIG. 11 is another embodiment of the user interface with exemplary machine information displayed on the screen.

FIG. 11 illustrates another example of a screen 114 of a user interface 110 on which machine information 120 for a portion of a machine 100 is displayed. In FIG. 11, the portion of the machine 100 is the sub assembly 132 of FIG. 6 and the displayed machine information 120 includes a comparison 134 of the quantity of core components 136a and the quantity of structurally significant components 136c and the quantity of bolt-on components 136d deducted from inventory by arrangement 104 or attachment 102.

FIG. 11 further illustrates that a certain quantity of components 106 of the sub assembly 132 that are categorized as core belong to a first arrangement 104a, that a certain quantity of components 106 that are categorized as structurally significant belong to a second arrangement 104b, and that a certain quantity of components 106 that are categorized as bolt-on belong to a third arrangement 104c.

The machine information 120 may further include comparison 134 a cost of the core components 144a and a cost of the optional components 144b. In some embodiments, the machine information 120 may include a cost of the structurally significant components 144c and a cost of the bolt-on components 144d. FIG. 11 illustrates such an embodiment where the displayed machine information 120 includes a comparison 134 of the cost of the core components 144a, the cost of the optional components 144b, the cost of the structurally significant components 144c and the cost of the bolt-on components 144d.

The method 300 includes, in block 325, modifying the categorization of a first attachment 102 (FIG. 3). In one embodiment, the attachment 102, or portions of the attachment 102 may be changed or redesigned such that the categorization of the attachment 102 is changed from one category to another. For example, an attachment 102, or portions of an attachment 102, may be changed such that the categorization of the attachment 102 is subsequently changed from core to optional or vice versa. In another embodiment, an attachment 102, or portions of the attachment 102, may be changed such that the attachment 102 now belongs in either the bolt-on category or in the structurally significant category instead of the core category.

The method 300 includes, in block 330, changing the assembly plan and process day(s) 138 based on the modifying of block 325. For example, changing a first process day 138 on which the first attachment 102 is deducted from inventory to a second process day 138 based on the modifying. In scenarios where an attachment 102 is moved from the core category to the optional category or from the structurally significant category to the bolt-on category the method 300 may further include delaying, by the controller 112, the need date of the first attachment 102 in the assembly plan. As such, the controller 112 may modify the assembly routings, or transmit such a revision to an assembly system 210 to modify the assembly routings as appropriate for the delay. In some embodiments, a move of the first attachment 102 from either the optional category (structurally significant or bolt-on) to the core category may further standardized the machine 100 and may pull forward in time the process day 138 for installation of the attachment 102.

The method 300 includes, in block 335, adjusting, by the controller 112, a need date for the plurality of components 106 of the first attachment 102 based on the changing in block 330.

In one embodiment, the method 300 may proceed to block 340. Block 340 includes assembling the machine 100 using the changed assembly plan. Alternatively, the method 300 may proceed to block 345. Block 345 includes modifying an assembly plan to assemble and store in inventory a Core Portion, or a substantially Core Portion, of the machine 100 that does not include the first attachment 102. The method 300 in block 345 may further include modifying the assembly plan to retrieve from inventory the Core Portion, or the substantially Core Portion, of the machine 100 and modifying the assembly plan to install the first attachment 102 on the Core Portion.

The method 300 includes, in block 350, assembling the Core Portion. Block 350 may further include storing the Core Portion in inventory.

The method 300 includes, in block 355, retrieving from inventory the Core Portion, or the substantially Core Portion, of the machine 100. In some embodiments, block 355 may occur after a customer order has been received for the machine 100. In other embodiments, block 355 may occur as part of a forecasted build.

The method 300 includes, in block 360, after the retrieving of block 355, installing at least one attachment 102 (categorized as optional (structurally significant or bolt-on)) on the Core Portion. In some embodiments, block 360 includes installing the first attachment 102 on the Core Portion.

Also disclosed is a method 300 relating to the assembly of a machine 100. The method 300 includes displaying on a user interface 110 an image 122 of a first portion of the machine 100, the first portion including at least a portion of a first attachment 102, wherein when the components 106 categorized as core are visually differentiated on the user interface 110 from components 106 categorized as optional. The method 300 further includes modifying the categorization of the first attachment 102, changing a first process day 138 on which the first attachment 102 is deducted from inventory to a second process day 138 based on the modifying, and adjusting, by a controller 112, a need date for the plurality of components 106 of the first attachment 102 based on the changing.

The features disclosed herein may be particularly beneficial for improving throughput in assembling machines 100. The system 108 and methods 300 disclosed herein provide a visualization tool to assist engineering and assembly with strategic improvements to machine 100 designs targeted to improve assembly efficiency, overall assembly throughput, and to reduce the number of days between a customer order and delivery of the machine 100. The system 108 and method 300 reduce the extent of reconfiguration of pre-built machines 100 for customization. Delay of customization improves the accuracy of material demand projections.

What is claimed is:

1. A system relating to an assembly process of a machine, the machine assembled over a plurality of process days, the system comprising:
    a user interface; and
    a controller in communication with the user interface, the controller configured to:
    display an image of a portion of the machine on the user interface, the machine including a plurality of attachments, each attachment categorized as core or optional, each attachment categorized as optional further categorized as either structurally significant or bolt-on, each attachment including a plurality of components, each component categorized the same as the attachment which the component is a part of, the portion including at least a portion of a first attachment, wherein components categorized as core are visually differentiated on the user interface from components categorized as optional;
    modify the categorization of the first attachment;
    delay the need date of the first attachment when the categorization of the first attachment is modified from structurally significant to bolt-on;
    change a first process day on which the first attachment is deducted from inventory to a second process day as a result of modifying a categorization of the first attachment;
    adjust a need date for the plurality of components of the first attachment based on the change to the second process day; and
    display a comparison of a quantity of core components, a quantity of structurally significant components and a quantity of bolt-on components deducted from inventory on the first process day.

2. The system of claim 1, in which the controller is further configured to receive a manufacturing BOM for the machine that includes an assembly, wherein the portion of the machine is the assembly.

3. The system of claim 1, in which the controller is further configured to receive a manufacturing BOM for the machine that includes a sub assembly, wherein the portion of the machine is the sub assembly.

4. The system of claim 1, in which the controller is further configured to display a comparison of the quantity of core components and a quantity of optional components deducted from inventory.

5. The system of claim 4, wherein the quantity of core components and the quantity of optional components are averages.

6. A method relating to an assembly process of a machine, the machine assembled over a plurality of process days, the method comprising:

displaying on a user interface an image of a first portion of the machine, the machine including a plurality of attachments, each attachment categorized as core or optional, each attachment categorized as optional further categorized as either structurally significant or bolt-on, each attachment including a plurality of components, each component categorized the same as the attachment which the component is a part of, the first portion including at least a portion of a first attachment, wherein components categorized as core are visually differentiated on the user interface from components categorized as optional;

modifying a categorization of the first attachment;

delaying the need date of the first attachment when the categorization of the first attachment is modified from structurally significant to bolt-on;

changing a first process day on which the first attachment is deducted from inventory to a second process day based on the modifying; and adjusting, by a controller, a need date for the plurality of components of the first attachment based on the changing; and displaying a comparison of a quantity of core components, a quantity of structurally significant components and a quantity of bolt-on components deducted from inventory on the first process day.

7. The method of claim 6, wherein the second process day is after the first process day.

8. The method of claim 6, wherein the second process day is before the first process day.

9. The method of claim 6 further comprising receiving a manufacturing BOM for the machine that includes an assembly, wherein the first portion of the machine is the assembly.

10. The method of claim 6, further comprising assembling and storing in inventory a Core Portion of the machine, each attachment in the Core Portion categorized as core.

11. The method of claim 10, further comprising:

retrieving the Core Portion from inventory after an order has been received for the machine; and after the retrieving, installing on the Core Portion at least one attachment categorized as optional.

12. The method of claim 6, further comprising displaying a comparison of a quantity of core components and a quantity of optional components deducted from inventory on each process day.

13. The method of claim 6 further comprising displaying for at least one process day a quantity of core components and a quantity of optional components.

14. A system for delaying differentiation in an assembly process of one or more machines in a group of related machines, each machine assembled over a plurality of process days according to an assembly plan, the system comprising:

a user interface; and a controller in communication with the user interface, the controller configured to:

display on the user interface for one or more of the machines a comparison of a quantity of core components, a quantity of structurally significant components and a quantity of bolt-on components, each machine including a plurality of attachments, each attachment categorized as core, structurally significant or bolt-on, each attachment including a plurality of components, each component categorized the same as the attachment which the component is a part of;

display on the user interface for at least one process day the quantity of core components and the quantity of structurally significant components and the quantity of bolt-on components deducted from inventory for at least one machine;

display on the user interface a first portion of at least one machine on the user interface, wherein components categorized as core, structurally significant or bolt-on are visually differentiated from each other;

modify a categorization of a first attachment;

delay the need date of the first attachment when the categorization of the first attachment is modified from structurally significant to bolt-on;

change a first process day on which the first attachment is deducted from inventory to a second process day when the categorization of the first attachment is changed; and adjust a need date for the first attachment based on the change from the first process day to the second process day.

15. The system of claim 14, in which the controller is further configured to modify the assembly plan to assemble and store in inventory a Core Portion of at least one machine, wherein the Core Portion does not include the first attachment.

16. The system of claim 15, in which the controller is further configured to modify the assembly plan to retrieve from inventory the Core Portion of at least one machine and install the first attachment on the Core Portion.

* * * * *